UNITED STATES PATENT OFFICE.

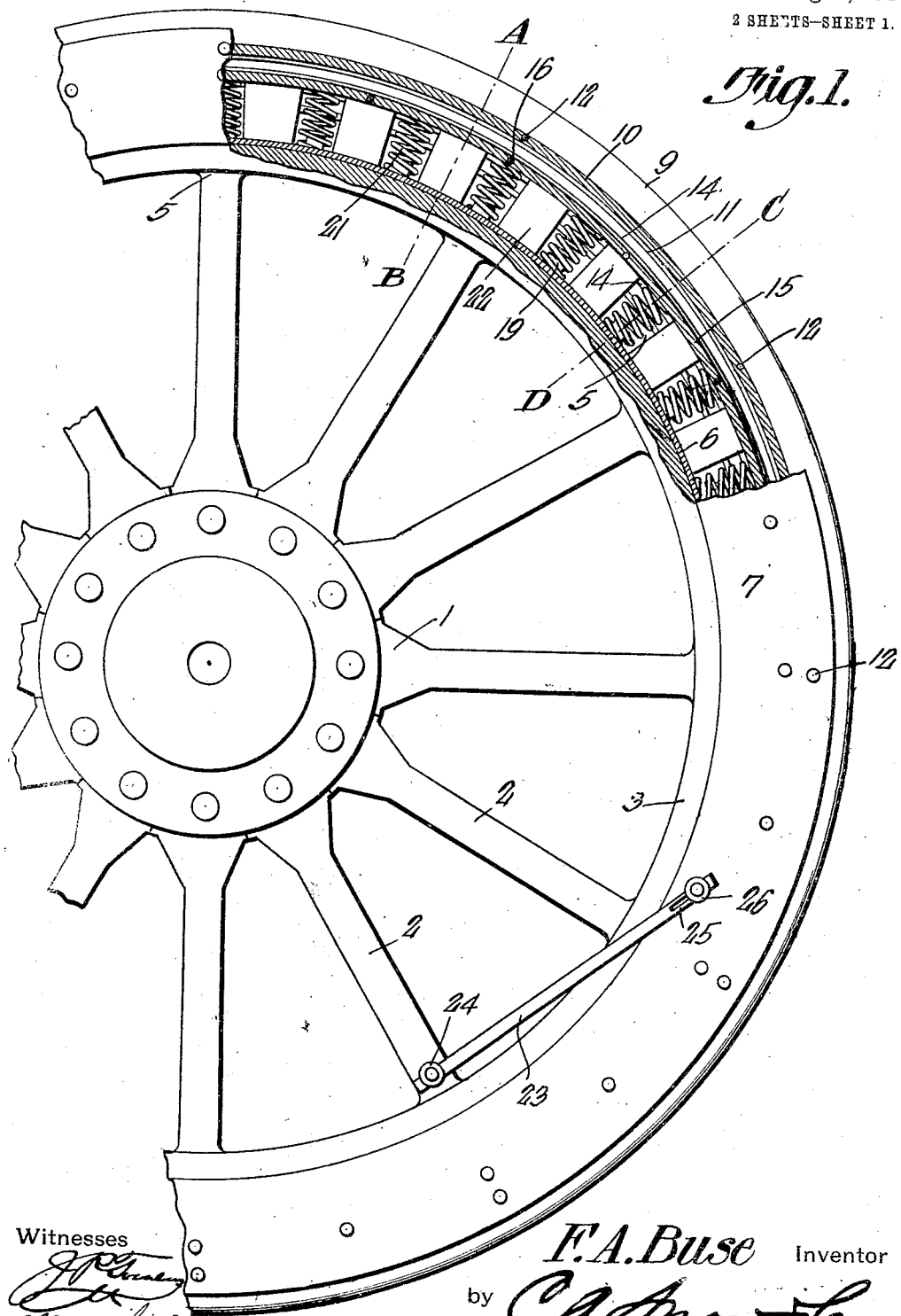

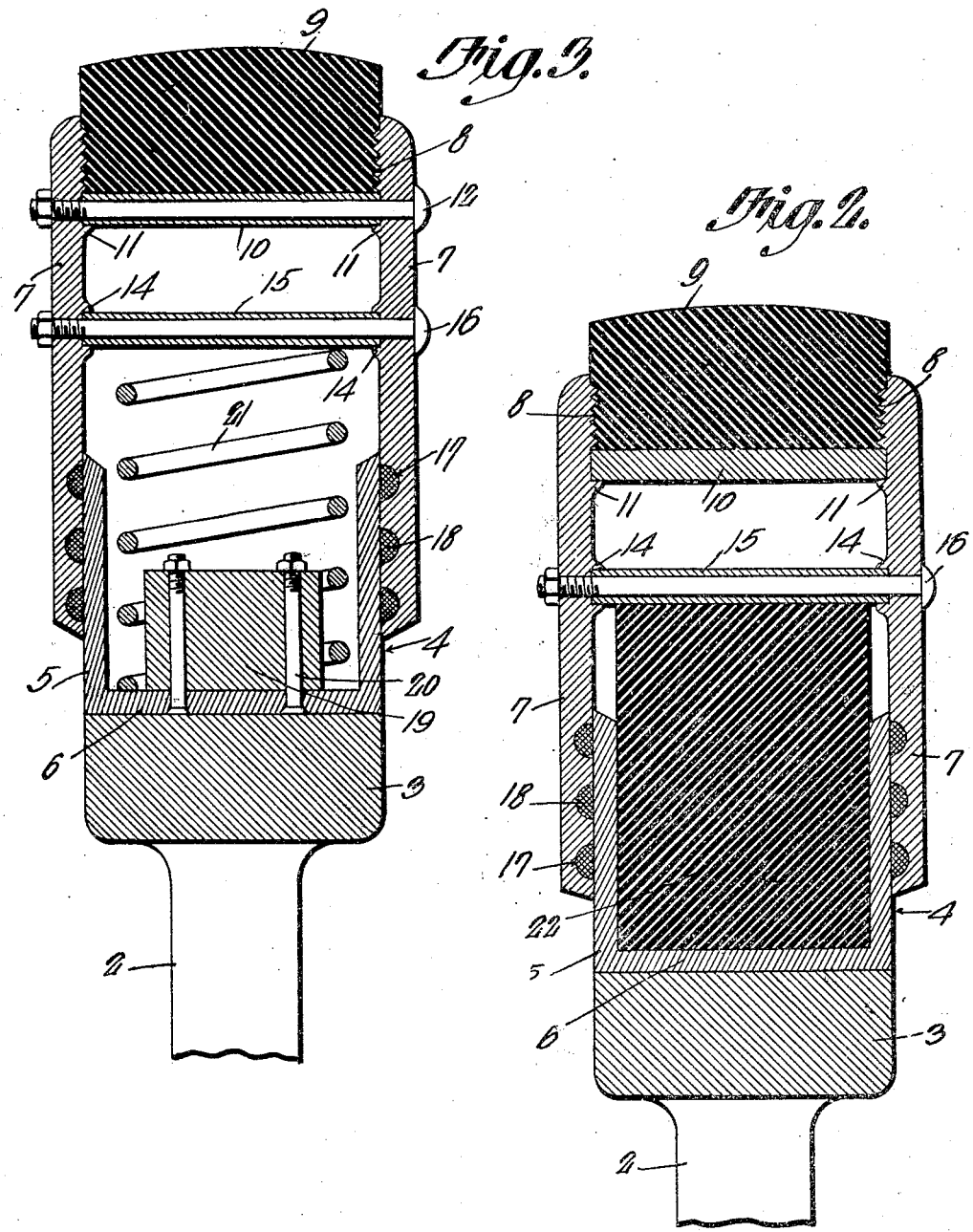

FREDERICK A. BUSE, OF POLSON, MONTANA.

AUTOMOBILE-WHEEL.

1,069,109.  Specification of Letters Patent.  Patented Aug. 5, 1913.

Application filed July 24, 1912. Serial No. 711,318.

*To all whom it may concern:*

Be it known that I, FREDERICK A. BUSE, a citizen of the United States, residing at Polson, in the county of Flathead and State of Montana, have invented a new and useful Automobile-Wheel, of which the following is a specification.

One object of the present invention is to provide novel means for spacing a tire yieldingly from a rim, and to provide novel means for preventing a creeping of the tire on the rim.

A further object of the invention is to provide novel means for holding the resilient elements in place, and to provide novel mechanism for facilitating the movement of the tire on the rim.

In the drawings,—Figure 1 shows in side elevation, a portion of a wheel constructed in accordance with the present invention parts being shown in section; Fig. 2 is a section on the line A—B of Fig. 1; and Fig. 3 is a section on the line C—D of Fig. 1.

In the accompanying drawings, the numeral 1 indicates the hub of the wheel, and the numeral 2 indicates the spokes, the spokes 2 carrying the felly 3. Mounted upon and secured to the felly 3 is a rim, the same preferably being a trough like structure, indicated generally at 4 and comprising side walls 5 and a base 6.

The tire includes a pair of side plates 7 provided adjacent their outer edges with serrations 8, adapted to engage the side faces of the tread 9 which may be fashioned from rubber, or from any other suitable substance. The tread 9 rests upon an annular band 10 upheld by shoulders 11 on the plates 7. Securing elements, preferably take the form of bolt and nut structures indicated at 12 passed through the band 10. The side plates 7 are further provided with other shoulders 14, receiving a band 15, and through the band 15 and through the side plates pass bolt and nut structures 16. The side plates 7 are in close and intimate sliding contact with the outer faces of the side walls 5 of the rim, the plates 7 being equipped with recesses 17, adapted to contain an absorbent packing 18 which may be saturated with a lubricant, or, if desired, a stiff lubricant of any sort may be interposed directly in the recesses 17.

A plurality of blocks 19 are secured to the base 6 of the rim, by means of attaching elements which may be bolt and nut structures 20. Surrounding the blocks 19 and retained thereby against movement circumferentially of the wheel, are helical springs 21. Alternating with the helical springs 21 are resilient blocks 22 which preferably are fashioned from rubber. The inner ends of the blocks 22 abut against the base 6 of the rim. the outer ends of the blocks 22 and of the springs 21 abutting against the band 15.

In order to prevent the tire structure above described from creeping circumferentially of the rim. one or more connecting members 23 are provided, each connecting member preferably taking the form of a bar, one end of which is pivoted as indicated at 24, to some portion of the wheel, preferably to one of the spokes 2. In the other end of the bar 23 there is a slot 25, and through the slot 25 passes a securing element 26 engaging one of the side plates 7, the construction being such that the securing element 26 may have movement in the slots 25.

Having thus described the invention, what is claimed is: —

1. In a device of the class described, a rim; a tire; resilient blocks interposed between the rim and the tire and abutting against the rim and the tire; helical springs alternating with the blocks and abutting against the rim and the tire; the blocks being spaced from the springs by a distance less than the diameters of the springs, whereby the blocks will constitute yielding means for limiting the lateral flexure of the springs.

2. In a device of the class described, a rim; side plates mounted to slide upon the rim, the side plates being provided with shoulders; bands located between the side plates and supported by the shoulders against movement radially of the rim; securing elements engaged with the side plates and extended through the bands, to prevent the bands from moving circumferentially of the rim; a tread supported by one band; and a spring, abutting at one end against the other band and at the other end abutting against the rim.

In testimony that I claim the foregoing as my own, I have hereto affixed my signature in the presence of two witnesses.

FREDERICK A. BUSE.

Witnesses:
ANDREW J. LOWARY,
PAUL M. WISHON.